(12) United States Patent
Gurney

(10) Patent No.: US 10,527,370 B2
(45) Date of Patent: Jan. 7, 2020

(54) COOLING PROCESS

(71) Applicant: LINDE AKTIENGESELLSCHAFT, Munich (DE)

(72) Inventor: Darren Richard Gurney, Merton Park (GB)

(73) Assignee: Linde Aktiengesellschaft, Munich (DE)

(*) Notice: Subject to any disclaimer, the term of this patent is extended or adjusted under 35 U.S.C. 154(b) by 0 days.

(21) Appl. No.: 14/653,867

(22) PCT Filed: Dec. 20, 2013

(86) PCT No.: PCT/GB2013/053378
§ 371 (c)(1),
(2) Date: Jun. 19, 2015

(87) PCT Pub. No.: WO2014/096845
PCT Pub. Date: Jun. 26, 2014

(65) Prior Publication Data
US 2015/0330725 A1    Nov. 19, 2015

(30) Foreign Application Priority Data

Dec. 20, 2012 (GB) .................................. 1222999.3

(51) Int. Cl.
B01D 61/02 (2006.01)
C02F 1/68 (2006.01)
(Continued)

(52) U.S. Cl.
CPC .............. *F28F 25/00* (2013.01); *B01D 61/02* (2013.01); *B01D 61/145* (2013.01); *C02F 1/281* (2013.01);
(Continued)

(58) Field of Classification Search
CPC .............................................. B01D 2311/2673
See application file for complete search history.

(56) References Cited

U.S. PATENT DOCUMENTS 4,547,294 A    10/1985  Goeldner
2003/0127391 A1    7/2003  Craft et al.
(Continued)

FOREIGN PATENT DOCUMENTS

EP    1325889 A1    7/2003
JP    H04 250880 A    9/1992
(Continued)

OTHER PUBLICATIONS

JP2002-310595 Machine Translation (pdf)—Oct. 23, 2002—Inoue et al.*
pH Control in Water Treatment Plant by the Addition of Carbon Dioxide_Al-Mutaz.pdf—"pH Control in Water Treatment Plant by the Addition of Carbon Dioxide"—Al-Mutaz, Ibrahim et al—The Ida World Congress on Desalination and Water Reuse—Oct. 2001.*
(Continued)

*Primary Examiner* — Bradley R Spies
(74) *Attorney, Agent, or Firm* — Donald T. Black

(57) ABSTRACT

A process for cooling a heated coolant, said process comprising:
(a) passing a heated coolant to an evaporative cooling apparatus wherein the coolant is cooled by evaporation;
(b) heating at least a portion of the coolant from step (a) to provide a heated coolant;
(c) recycling at least a portion of the heated coolant from step (b) to step (a) to form a circuit;
wherein the process further comprises passing at least a portion of the coolant to a reverse osmosis unit to form a retentate solution and a permeate solution; introducing at least a portion of the permeate solution into the circuit; and removing the retentate solution.

8 Claims, 2 Drawing Sheets

Figure 1:
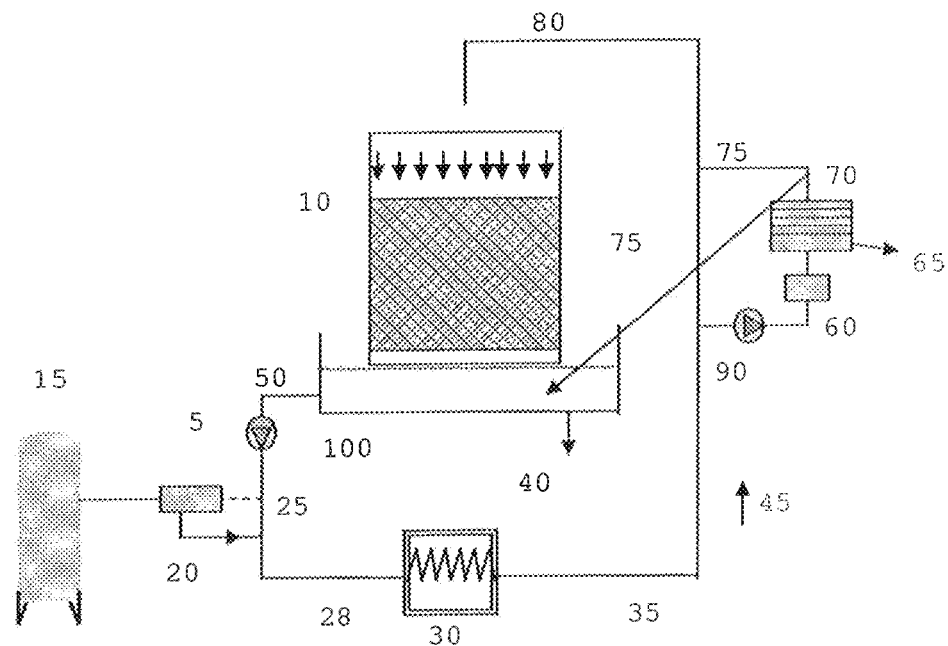

(51) Int. Cl.
- *B01D 61/14* (2006.01)
- *C02F 1/44* (2006.01)
- *C02F 9/00* (2006.01)
- *C02F 103/02* (2006.01)
- *F28F 25/00* (2006.01)
- *C02F 1/28* (2006.01)
- *C02F 1/38* (2006.01)
- *C02F 1/00* (2006.01)

(52) U.S. Cl.
CPC .............. *C02F 1/441* (2013.01); *C02F 1/444* (2013.01); *C02F 1/68* (2013.01); *C02F 9/00* (2013.01); *B01D 2311/12* (2013.01); *B01D 2311/2626* (2013.01); *B01D 2311/2673* (2013.01); *C02F 1/28* (2013.01); *C02F 1/38* (2013.01); *C02F 2001/007* (2013.01); *C02F 2103/023* (2013.01); *C02F 2209/06* (2013.01); *C02F 2303/04* (2013.01); *C02F 2303/22* (2013.01); *F28F 2025/005* (2013.01)

(56) References Cited

U.S. PATENT DOCUMENTS

| | | |
|---|---|---|
| 2004/0050792 A1 | 3/2004 | Bonds et al. |
| 2010/0032375 A1 | 2/2010 | Jagannathan |
| 2011/0108405 A1 | 5/2011 | Bommareddy et al. |
| 2012/0255908 A1 | 10/2012 | Duke et al. |

FOREIGN PATENT DOCUMENTS

| | | |
|---|---|---|
| JP | H07 109585 A | 4/1995 |
| JP | 2002/310595 A | 10/2002 |
| WO | WO 2013/091129 A1 | 6/2013 |

OTHER PUBLICATIONS

International Search Report for PCT/GB2013/053378, 3 pages, dated Mar. 24, 2014, Authorized Officer, Oliveria, Casimiro; and. Written Opinion of the International Searching Authority for PCT/GB2013/053378, 6 pages, dated Mar. 24, 2014, Authorized Officer, Oliveria, Casimiro.

\* cited by examiner

COOLING PROCESS

The present invention relates to a process for cooling a heated coolant and a cooling apparatus. The process and apparatus may be used for controlling the total dissolved solids in a cooling circuit.

Heat exchangers are often used to remove excess heat from industrial processes. Typically heat exchangers work by passing a hot process stream through an exchanger, where the hot stream comes into indirect contact with a coolant. During this process, the coolant is heated and the process stream is cooled. Thus, the coolant exiting the heat exchanger is warmer than the coolant entering the heat exchanger. In contrast to this, the process stream exiting the heat exchanger is cooler than the hot process stream entering the exchanger.

The heated coolant may be cooled by evaporative processes, such as passing it through a cooling tower. In such evaporative processes, heat is lost by evaporation (evaporative cooling), which lowers the temperature of the remaining coolant. The cooled coolant may then be recirculated to the heat exchanger, where it is heated and subsequently cooled by recirculating it to an evaporative cooling apparatus. However, because the evaporative loss is typically pure solvent (typically water), the water or coolant, remaining in the cooling circuit becomes concentrated with dissolved solids, which can lead to scaling and corrosive conditions. Such contaminants can cause fouling, for example, as a result of biological growth, scale formation, corrosion and/or sludge deposition.

The current practice to prevent or control this problem is to remove a portion of the recirculating coolant (typically water) from the system as a purge stream (blow-down). Typically, the portion of coolant removed as blow-down is removed after it has been cooled in the evaporative cooling apparatus. Thus, water or coolant having a high total dissolved solid content is drained from the system via blow-down. The associated losses caused by blow-down, evaporation, and system leaks are addressed by adding make-up water and/or coolant to the system. Typically, the make-up water is lower in total dissolved solids than the coolant (typically water) in the cooling circuit.

Prior art methods of operating cooling towers are based on maintaining a fixed total dissolved solids (TDS) concentration in the recycle flow, normally by on-line analysis of conductivity. As outlined above, this is achieved by releasing coolant from the recycle circuit and replacing it with fresh make-up water of lower total dissolved solids (TDS) concentration. This means that large amounts of new (fresh) coolant must be fed into the recirculating water system. This may be expensive for one or more of the following reasons: the costs associated with:

(i) obtaining and/or transporting the coolant;
(ii) additives/de-scalants/biocides etc added to the coolant; and/or
(iii) any pre-treatment steps of the coolant required before using it as make-up coolant (water).

Moreover, such processes require the removal of significant amounts of coolant as blow-down. The subsequent disposal of blow-down coolant is also expensive. This is because the blow-down typically contains high levels of contaminants which are or may be considered toxic/undesirable. Thus, water companies levy Trade Effluent Charges (TECs)/payments to treat such waste coolant. Operators of cooling towers typically pay TECs for and require licenses/permits in order to discharge agreed quantities of wastewater obtained from such processes.

It is one object of the present invention to overcome or address the problems of prior art processes/apparatuses for cooling or to at least provide a commercially useful alternative thereto. It is an alternative and/or additional object to provide a process/apparatuses for cooling a heated coolant which is more cost effective to operate than known processes and/or uses less coolant over the lifetime of the operation of the cooling system.

It is an alternative and/or additional object to provide a process/apparatus for cooling a heated coolant which increases the cycles of concentration of the coolant. It is an alternative and/or additional object to provide a process/apparatus for cooling a heated coolant in which scaling in the process is reduced.

It is an alternative and/or additional object to provide a process/apparatus for cooling a heated coolant which increases the cycles of concentration of the coolant.

In a first aspect of the present invention there is provided a process for cooling a heated coolant, said process comprising:

(a) passing a heated coolant to an evaporative cooling apparatus wherein the coolant is cooled by evaporation;
(b) heating at least a portion of the coolant from step (a) to provide a heated coolant;
(c) recycling at least a portion of the heated coolant from step (b) to step (a) to form a circuit;
wherein the process further comprises passing at least a portion of the coolant to a reverse osmosis unit to form a retentate solution and a permeate solution; introducing at least a portion of the permeate solution into the circuit; and removing the retentate solution.

The present invention will now be further described. In the following passages different aspects of the invention are defined in more detail. Each aspect so defined may be combined with any other aspect or aspects unless clearly indicated to the contrary. In particular any feature indicated as being preferred or advantageous may be combined with any other feature or features indicated as being preferred or advantageous.

In a further aspect of the present invention there is provided an apparatus comprising:

a heat exchanger for heating a coolant;
an evaporative cooling apparatus for cooling a coolant;
wherein the heat exchanger is in fluid communication with the evaporative cooling apparatus and configured such that, in use, coolant can be circulated from the heat exchanger to the evaporative cooling apparatus and back to the heat exchanger;
a reverse osmosis unit having an inlet, a first outlet for removing retentate, and a second outlet; wherein the inlet for introducing coolant into the reverse osmosis unit is in fluid communication with the heat exchanger and/or the evaporative cooling apparatus; and wherein the second outlet for introducing permeate from the reverse osmosis unit to the heat exchanger and/or the evaporative cooling apparatus is in fluid communication with the heat exchanger and/or the evaporative cooling apparatus.

In the present invention, the heated coolant is preferably passed to the reverse osmosis unit.

The coolant may be heated using, for example, a heat exchanger. The heat exchanger may preferably be positioned upstream of the reverse osmosis unit such that, in use, heated coolant may be passed to the reserve osmosis unit.

In the present invention, the process advantageously further comprises introducing an acidic gas into the coolant. The acidic gas preferably consists of or comprises carbon dioxide. In particular, carbon dioxide can advantageously be added to the cooling circuit to control the bicarbonate (HCO3-) and the carbonate (CO32-) balance by reducing the pH by the production of carbonic acid (H2CO3).

The combination of the use of an acidic gas and reverse osmosis has been found particularly effective in controlling dissolved solids in the cooling circuit.

The acidic gas may be introduced into the coolant prior to heating the coolant.

The apparatus may further comprise means for introducing the acidic gas into the coolant. Such means for introducing the acidic gas into the coolant is preferably positioned upstream of the heat exchanger. Alternatively, or in combination, the acidic gas may be added downstream of the heat exchanger.

The evaporative cooling apparatus may comprise, for example, a cooling tower.

The coolant may comprise, for example, one or more of river water, bore hole (well water), mains water (tap water) and/or reclaimed waste water.

The coolant may further comprise additives selected from one or more scale inhibitors, corrosion inhibitors, biocides, and mixtures thereof.

The process advantageously further comprises passing at least a portion of the coolant to a pre-treatment stage. The pre-treatment stage may comprise, for example, one or more of a multimedia filter, micro-filtration, nano-filtration unit, activated charcoal filter and ultrafiltration. Such pre-treatment will usually occur prior to introduction into the reverse osmosis unit.

In a preferred embodiment, the apparatus as herein described further comprises an ultra-filtration unit, which is preferably configured such that, in use, coolant passes through the ultra-filtration unit prior to passing through the reverse osmosis unit.

In another preferred embodiment, the apparatus as herein described further comprises a carbon filter unit, which is preferably configured such that, in use, coolant passes through the carbon filter unit prior to passing though the reverse osmosis unit.

In the process described herein, heated coolant is circulated to an evaporative cooling apparatus where it is cooled. At least a portion of the cooled coolant is then heated to provide a heated coolant. At least a portion of the heated coolant is then recycled to the evaporative cooling apparatus to form a circuit. Thus, at least a portion of the coolant is recirculated around the circuit.

In step (c) of the process, typically at least 50% by volume (preferably at least 60%, more preferably at least 80%, still more preferably at least 95%, still more preferably at least 98%, most preferably at least 99% by volume) of the heated coolant from step (b) is recycled to step (a) based on the total amount of the heated coolant. Normally all the coolant is returned in the circuit to the cooling tower after being through the heat exchanger. Only losses by evaporation and windage (this varies with air temperature) are not controlled. The blow down normally occurs from the cooling tower pond.

As the coolant is repeatedly heated and subjected to evaporative cooling and as evaporation occurs, contaminants, such as dissolved solids build up in the recirculated coolant. Such contaminants can cause fouling, for example, as a result of biological growth, scale formation, corrosion and/or sludge deposition.

The process described herein comprises passing at least a portion of the coolant to a reverse osmosis (RO) unit to form a retentate solution and a permeate solution. At least a portion of the permeate solution is introduced into the circuit, where it can be recycled or recirculated around the cooling circuit. The retentate solution is removed and may be discarded as a concentrated waste solution.

Using a RO unit to treat the coolant is advantageous because it allows a portion of the coolant (the permeate solution) to be demineralised (the total dissolved solids is reduced compared to the untreated coolant) and then returned to the coolant circuit, whilst it concentrates the bulk of the dissolved minerals/impurities into a smaller waste stream (retentate solution). The retentate solution can then be removed.

Furthermore, by incorporating the RO unit into the coolant circuit, or at least having it in fluid-communication with the coolant circuit, rather than, for example, on the make-up feed or the blow-down stream, the coolant can be recirculated in the circuit for longer before blow-down of the coolant is required.

The use of the RO unit may also allow the number of cycles of concentration to be increased.

As used herein the coolant circuit includes the coolant recirculation loop from the heating means (preferably a heat exchanger) to the evaporative cooling apparatus and back. It does not include the treatment of blow-down or make-up feed. The coolant circuit may be, for example, a closed loop, an open, or a semi-open loop.

Closed circuit cooling towers operate in a manner similar to open cooling towers, except that the heat load to be rejected is transferred from the process fluid (the fluid being cooled) to the ambient air through a heat exchange coil. The coil serves to isolate the process fluid from the outside air, keeping it clean and contaminate free in a closed loop. This creates two separate fluid circuits: (1) an external circuit, in which spray water circulates over the coil and mixes with the outside air, and (2) an internal circuit, in which the process fluid circulates inside the coil. During operation, heat is transferred from the internal circuit, through the coil to the spray water, and then to the atmosphere as a portion of the water evaporates.

Preferably, the bulk of the coolant is recirculated in a loop such that the majority (typically at least 50%, preferably at least 90%, more preferably at least 95%, more preferably at least 98% by volume of coolant based on the total volume) of the coolant in the coolant circuit is recycled around the circuit each loop.

It has been found that by incorporating the RO unit into the coolant circuit, the cycles of concentration in the coolant circuit can be increased. The term cycles of concentration is used to describe the mass flow relationship or (concentration ratio) between the amount of system feed source and the amount of blow-down removed from the system (or the ratio of total dissolved solids (TDS) in the system: total dissolved solids (TDS) of the make-up solution). This may also be referred to as concentration ratio. The cycles of concentration correlate to the effective use of coolant (typically comprising water) in the system to provide heating and cooling needs. High cycles of concentration are directly related to low levels of coolant (solvent or water) loss from the system, which is advantageous.

Abbreviation Explanation

CR concentration ratio or number of cycles
MU make up rate (cubic meters per hour)
BD blow down rate (cubic meters per hour)
E evaporation rate (cubic meters per hour)
TDS total dissolved solids (milligrams per liter or mg/l)
W windage losses (cubic meters per hour)

The overall mass balance around a typical cooling tower may be considered as:

Water balance $MU=E+BD+W$ (Equation 1)

Using the present invention the blow-down volume may be reduced to zero (or may be substantially reduced) and substantially all (preferably all) of the water lost from the system (except via E and W) may be retentate solution removed from the RO unit and back wash from the RO unit.

The cycles of concentration in terms of make-up flow and blow-down may be described as:

$$CR = \frac{MU \text{ rate}}{BD \text{ rate}} = \frac{\text{Concetration system}}{\text{Concemtration } MU} = \frac{TDS \text{ System}}{TDS \ MU} \quad \text{(Equation 2)}$$

Increasing the cycles of concentration is advantageous because it saves coolant, as coolant is being recirculated for longer through the system before being blown down. However, as levels of dissolved minerals elevate with higher cycles of concentration, scaling and corrosion potential increases. Thus, inclusion of the RO unit in the described process aims to address some of these problems and to provide a process and/or apparatus in which maximum cycles of concentration can be achieved, and a cooling system which can be operated at high (preferably) peak efficiency in terms of water use and/or energy.

A further advantage of installing the RO unit in the cooling circuit rather than, for example, on the make-up coolant line, is that it reduces the need to have a system that can respond to variations in make-up coolant demand which would potentially require a series of modular RO units having oversized capacity in the winter and adequate capacity for most of the summer months.

A further advantage is that the RO unit may also remove biological microorganisms and/or pathogens from the cooling circuit and dispose of them via the reject stream from the outlet in the retentate stream.

Preferably, all the permeate solution from the RO unit is introduced into the cooling circuit (the recirculating coolant). It is advantageous to typically introduce at least 90%, preferably at least 95% and more preferably at least 98% by volume of permeate solution based on the total volume of permeate produced, more preferably at least 99% by volume of permeate solution based on the total volume of permeate produced to the circuit. Most preferably, substantially all of the permeate solution produced is introduced into the circuit (the recirculating coolant). It is desirable to introduce high amounts of the permeate solution into the circuit in order to maintain as high a possible level of coolant in the recirculating system before it is necessary to feed new coolant into the system. Typically, retentate losses will be around 25% by volume of the coolant based on the total volume of coolant introduced to the RO unit inlet.

The RO unit may be positioned anywhere on or within fluid communication with the coolant circuit. The process and/or apparatus may be designed such that only a portion of the coolant in the circuit (in each recycling loop) is passed to the RO unit. The RO unit may be positioned such that typically less than 10%, preferably less than 20%, more preferably less than 30%, still more preferably less than 50% by volume of the coolant based on the total volume of coolant in the circuit in the circuit passes to the RO unit.

Alternatively or additionally, the RO unit may be positioned such that typically at least 50%, preferably at least 60%, more preferably at least 80%, more preferably at least 90%, more preferably at least 95%, more preferably at least 99.5% by volume of the coolant based on the total volume of coolant in the circuit, or substantially all of the coolant in the circuit, passes to the RO unit. Thus, the RO unit may be positioned such that substantially all of the coolant flowing around the circuit passes through the RO unit. One advantage of passing high levels of the coolant to the RO unit is that more of the coolant can be purified.

Preferably less than 35%, more preferably less than 30%, more preferably still approximately 25% by volume of the coolant based on the total volume of coolant entering the RO unit is discarded as retentate.

Preferably in the process and/or the apparatus described herein the neat exchanger is positioned upstream of the RO unit such that, in use, heated coolant may be passed to the RO unit. Thus, the RO unit is preferably positioned such that the heated coolant is passed into the RO unit. In this embodiment, the heated coolant passes into the RO unit forming a retentate solution (which is removed or discarded from the system or circuit) and a permeate solution. At least a portion of the permeate solution is then introduced into the circuit where it subsequently passes to the evaporative cooling apparatus and where it is cooled. The present inventors have surprisingly found that one advantage of passing heated coolant, rather than the cooled coolant, to the RO unit is that the power consumption of the RO unit will be reduced. Without wishing to be bound by any particular theory, it is thought that this is because the heated (or warm) coolant requires less pressure to achieve the same total dissolved solids removal. This may be a result of the viscosity of the heated coolant being lower than the viscosity of the same cool coolant and this in turn affects the flux rate of the water through the membranes. As a lower pressure is required to achieve the same result, the same amount of coolant can be treated for less power, potentially resulting in up to 30% energy saving.

In an additional or alternative embodiment, the RO unit is positioned such that cooled coolant is passed to the RO unit (i.e. coolant that has passed from the evaporative cooling apparatus, but has not yet been heated, for example by passing through a heat exchanger). In this embodiment, the cooled coolant passes into the RO unit forming a retentate solution (which is removed or discarded from the system or circuit) and a permeate solution. At least a portion of the permeate solution is then introduced into the circuit where it is subsequently heated (for example by passing it through a heat exchanger).

One or more RO units may be used in series or in parallel in the described process and/or apparatus. One or more RO units may be positioned in different places in the cooling circuit (i.e. with respect to the evaporative cooling apparatus and/or the heating means, for example the heat exchanger). Where more than one RO unit is used, each unit may be independently selected. Thus, the units may be same or different. In one embodiment, multiple RO units may be used in series such that at least some of the retentate from the first unit is fed to the second unit, to further concentrate the retentate solution. The permeate from the first unit and optionally the permeate from the second unit may be re-introduced into the coolant circuit. Preferably, up to 75% by volume of the retentate treated by the second unit may be reintroduced into the cooling circuit as permeate.

Any suitable two-stage, for example, RO unit may be used in the present invention.

Common membrane materials for use the RO unit include polyamide thin film composites (TFC), cellulose acetate (CA) and cellulose triacetate (CTA) with the membrane material being spiral wound around a tube, or hollow fibres bundled together. Hollow fibre membranes have a greater surface area and hence capacity but are more easily blocked than spiral wound membranes and may, therefore, require a pre-treatment stage to reduce fouling and clogging.

Preferably, a pressure of from 12.5 barg to 8.0 barg is applied to the high concentration side of the membrane in the RO unit(s).

To increase the efficiency of the claimed process, the RO membranes are preferably treated to reduce fouling and/or scaling of the membrane in the unit. Accordingly, anti-scaling and/or anti-fouling agents may be added to the coolant. The membranes are typically treated during a backwash cycle which last approximately one hour per day to remove scale and prevent fouling of membranes. This is a standard procedure for all RO units.

The process may further comprise a pre-treatment step for removing contaminants, such as suspended particles and/or biological matter from the coolant. The pre-treatment step may comprise passing the coolant through an ultra-filtration unit. Suitable ultra-filtration units are known in the art.

Preferably the ultra-filtration unit is configured such that, in use, coolant passes through the ultra-filtration unit prior to passing through the RO unit. Thus, the ultra-filtration unit is preferably positioned upstream of the RO unit. This is advantageous because it reduces contaminants entering the RO unit.

The coolant may be passed through a carbon filter. Preferably the heated coolant is passed through a carbon filter.

The coolant may be passed through a sand and/or media filter. Preferably the heated coolant is passed through a sand and/or multimedia filter.

In one embodiment, the process comprises: passing at least a portion of the heated coolant to a multimedia filter and/or an ultra-filtration unit and/or activated carbon unit; then to a RO unit; then to an evaporative cooling apparatus; and subsequently heating the coolant and recycling at least a portion of it around the circuit. The desired, or optimal, pre-treatment requirements will depend on the quality of the coolant. The pre-treatment technology used may be determined on a case-by-case basis depending on the physical-chemical process for removing said pollutant, e.g., size exclusion, adsorption, filtration, gravity settlement, gravimetric separation (hydro-cyclones).

Preferably, the coolant is heated using a heat exchanger. As outlined above, heat exchangers typically work by passing a hot process stream through an exchanger, where the hot stream comes into indirect contact with a coolant. During this process, the coolant is heated and the process stream is cooled. Thus, the coolant exiting the heat exchanger is warmer than the coolant entering the heat exchanger. In contrast to this, the process stream exiting the heat exchanger is cooler than the hot process stream entering the exchanger.

The process stream to be cooled may be, for example, a process stream from oil refining, chemical processing, power plants, steel mills and other manufacturing processes. Other industrial processes in which the present invention finds application include compressed air production in inter-stage and after-stage coolers, etc.

The present invention may also be used in cooling large commercial buildings, for example airports, office buildings, conference centres, hospitals, and hotels.

Typically, the coolant is heated to a temperature of up to 25° C., preferably up to 35° C., more preferably up to 40° C., depending on the specific process in which the process/apparatus is used. When the coolant is cooled, it is typically cooled to a temperature close to the wet bulb temperature.

Any suitable evaporative cooling apparatus may be used in the present invention. Once through systems are generally not suitable for use in the invention. Any suitable cooling tower may be employed in the present invention. Examples of suitable cooling towers include natural draft and mechanical forced draft cooling towers, open and closed cooling towers.

The evaporative cooling apparatus will usually comprise a basin or pond, for example, where coolant is captured after falling through the cooling stage.

The coolant is preferably aqueous. Preferably the coolant comprises or consists substantially of water. The coolant may come from a surface water source, such as, lakes, rivers and streams. Alternatively and/or additionally, the coolant may come from a groundwater source, such as a well or aquifer. The coolant may comprise, river water, bore hole (well water), mains water (tap water) and/or reclaimed (or treated) waste water.

Depending on the coolant used and its source, the coolant may have high levels of suspended solids and/or debris, which may cause fouling if not removed by pre-filtration systems.

Typically the coolant make-up is pre-treated to remove suspended solids, organic matter and micro-organisms. Operators typically use the highest quality water available because the cost of treatment will vary depending on the initial quality.

Whatever the source of the coolant, it is advisable to take into account several quality conditions for the coolant. For example, the coolant's pH, hardness, alkalinity and/or conductivity. The process described herein may therefore include one or more steps of measuring, monitoring and/or testing one or more of the coolant's pH, hardness, alkalinity and/or conductivity. Moreover, the apparatus described herein may comprise suitable means for measuring, monitoring and/or testing one or more of the coolant's pH, hardness, alkalinity and/or conductivity. For example, the apparatus may comprise one or more alkalinity meters and/or conductivity and pH probes.

Preferably, the apparatus described herein comprises a means for introducing an acidic gas into the coolant. More preferably, the means for introducing the acidic gas into the coolant is positioned upstream of the heat exchanger. The means for introducing the acidic gas into the coolant may comprise acidic gas (eg $CO_2$ or $SO_2$) dosing equipment, for example.

Preferably, the process/apparatus comprises introducing an acidic gas into the coolant. Preferably, the acidic gas is introduced into the circulating coolant, rather than the make-up feed. The acidic gas may comprise or consist of sulphur dioxide and/or carbon dioxide. Preferably the acidic gas comprises or consists of carbon dioxide. It is particularly preferred to introduce carbon dioxide gas into the system. The $CO_2$ species formed in the coolant (typically water), is dependent on the pH of the water. This usually means that it is mainly present as $H_2CO_3$ and undissolved $CO_2$ at pH below 6.5; from pH 6.5 up to pH 8.3, $H_2CO_3$ and mainly bicarbonate ($HCO_3^-$); and from pH 8.3 to 10.3, mainly $HCO_3^-$ and carbonate ion ($CO_3^{2-}$) anions. In the presence of cations, for example $Ca^{2+}$ and/or $Mg^{2+}$, the resulting carbonate salts are prone to precipitating out of solution causing scaling and/or fouling of the apparatus (for example membranes and filters). Carbon dioxide addition can advantageously be used to maintain the pH at a level which pushes the equilibrium towards bicarbonate ($HCO_3^-$) carbonic acid ($H_2CO_3$) and free carbon dioxide ($CO_2$), thereby reducing scaling and fouling of the apparatus. This means that a higher total dissolved solids concentration can be maintained. The addition of carbon dioxide may also allow greater cycles of concentration to be achieved than would be achieved if RO was used in isolation.

A further advantage is that the addition of carbon dioxide may reduce the quantity of mineral acid (for example HCl and/or $H_2SO_4$) to the coolant in order to maintain the pH at a level where scaling in the recycle coolant is reduced and/or substantially avoided (i.e. at a slightly negative Langellier scaling index value). It is preferable to avoid adding large quantities of HCl and/or $H_2SO_4$ if possible to avoid corrosion of the apparatus.

The present inventors have found that the combination of the use of an acidic gas (eg $CO_2$) and a RO unit to be particularly effective in controlling dissolved solids in the cooling water circuit.

The addition of carbon dioxide may be measured and/or controlled based on the pH and/or alkalinity, $Ca^{2+}$ concentration and/or conductivity of the coolant.

An example of a suitable apparatus for measuring the pH and/or alkalinity of the coolant is an Orp/pH combination electrode and alkalinity probe.

Typically, $CO_2$ will be added to the coolant in an amount of approximately 30 to 80 mg/L. This is preferred in order to make an adjustment of the pH in the range to maintain substantially all of the calcium present as $HCO_3^-$ species before entering the RO unit. Advantageously, this also prevents or reduces the rate of scale build-up on the neat exchanger surface.

The acidic gas may be fed into the coolant continuously during the cooling process or it may be fed in intermittently. It may be added directly to the cooling tower pond or to the permeate created by the RO unit which, in turn, may be added to the cooling tower pond or reservoir.

Although the acidic gas may be added to the coolant at any point in the coolant circuit, it is preferably added to the cool (unheated) coolant. This is because the increased acidic gas (eg $CO_2$) reduces scaling in the heat exchanger (prolonging the period between shutdowns for descaling and maintaining design heat removal as scale thickness on heat exchanger reduces effectiveness).

One or more acidic gas feeds may be included in the circuit.

The process may further comprise manual sampling of the coolant to ensure dosing levels are suitable.

It may be advantageous to run the RO continually during the cooling process. Alternatively, the RO unit may be run in a batch type process (for example, running the RO unit for a fixed amount of time (for example for from 15 hours to 22 hours per day), then stopping the RO unit whilst the cooling process continues running (for example for from 1 to 2 hours), and then running the RO process again (for example for from 15 hours to 22 hours), and repeating. Typically the RO unit is stopped for cleaning during a 24 hour period.

The present invention enables the overall operating costs for the operator to be reduced as the demand for make-up coolant (typically water) is less and the amount of coolant discharged (typically to the sewer) will also fall.

The present invention will now be described further, by way of example only, with reference to the following figures, in which:

FIG. 1: shows a schematic diagram of a flow scheme for carrying out the process/apparatus according to an embodiment of the present invention.

Figure 2:
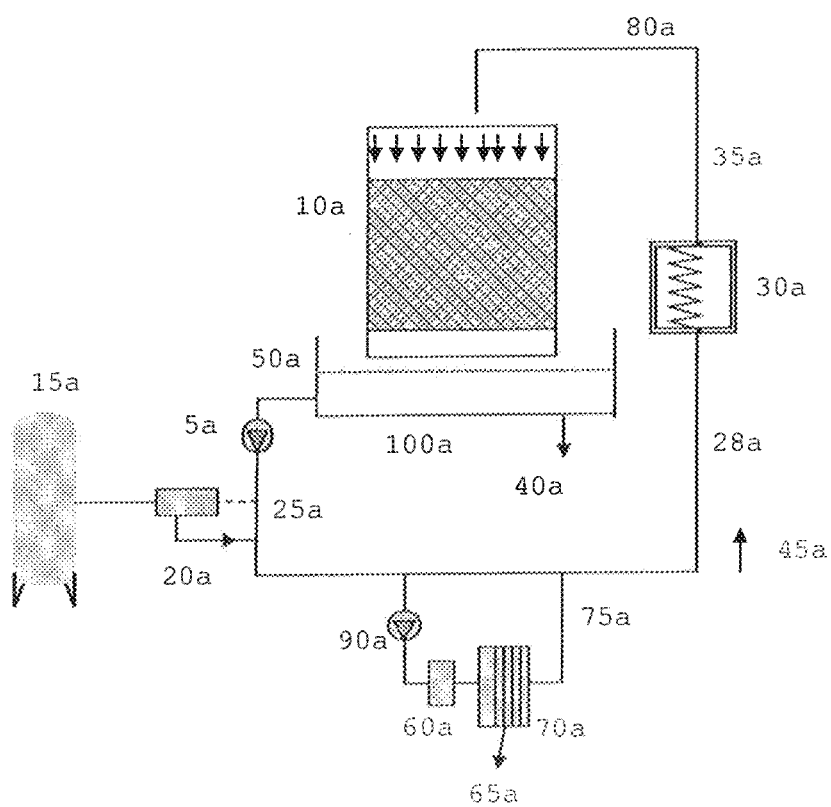

FIG. 2: shows a schematic diagram of a flow scheme for carrying out the process/apparatus according to an alternative embodiment of the present invention.

Figure 3:
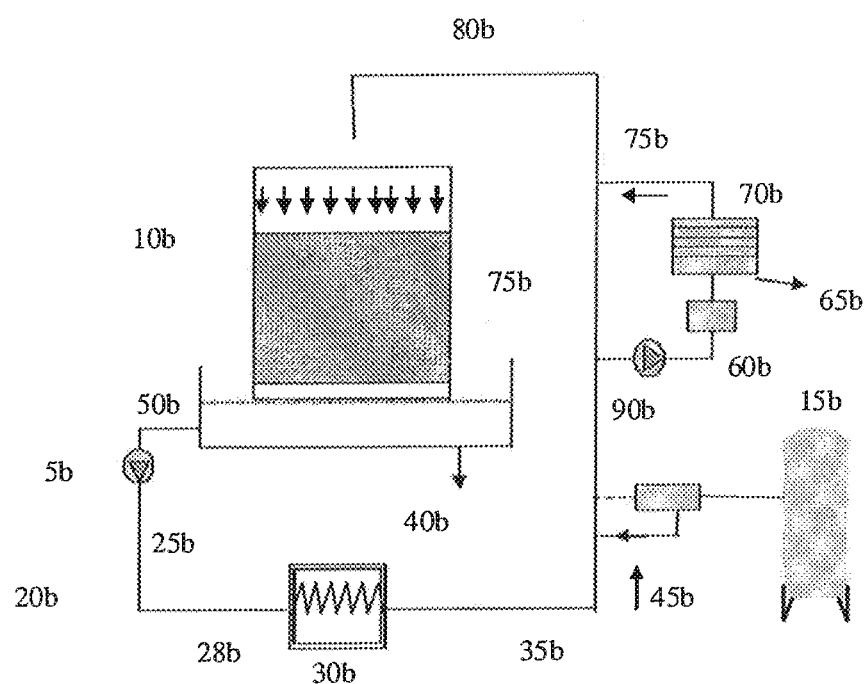

FIG. 3: shows a schematic diagram of a flow scheme for carrying out the process/apparatus according to a further alternative embodiment of the present invention.

The numbering on the drawing (FIG. 1) depicts the following features:
   5 cooling circuit pump(s)
   10 evaporative cooling apparatus, for example cooling tower (for example media packed).
   15 $CO_2$ storage vessel
   20 $CO_2$ gas
   25 control means for introducing $CO_2$ into the circuit
   28 coolant introduced to the heat exchanger
   30 heat exchanger
   35 heated coolant from the heat exchanger
   40 blow-down
   45 direction of coolant recycling around circuit
   50 cooled coolant
   60 optional pre-treatment unit
   65 retentate solution rejected
   70 reverse osmosis (RO) unit
   75 permeate solution
   80 heated coolant introduced to evaporative cooling apparatus (approximately 15 to 35° C.)
   90 optional booster pump flow (3.0 to 3.5 barg).
   100 pond or reservoir Coolant (28) passing through the heat exchanger (30) is heated (from 28 to 35). As the coolant is heated the industrial process stream (not shown) is cooled. The heated coolant (35, 80) is passed from the heat exchanger to the evaporative cooling apparatus (10) where it is cooled by evaporation. The evaporative cooling apparatus (10) may be a cooling tower. At least a portion of the cooled coolant (50) is recirculated to the heat exchanger (30) where it is heated (from 28 to 35), and then recycled to the evaporative cooling apparatus (10) to form a coolant circuit of recirculating coolant. At least a portion of the coolant is passed from the coolant (or recirculating) circuit to a RO unit (70) to form a retentate solution (65) and a permeate solution (75). The retentate solution is removed from the circuit. At least a portion of the permeate solution (75) is introduced into the circuit. The permeate (75) may be returned into the cooling circuit directly via the pond (100)

Thus, in one embodiment, at least a portion of the coolant in the recirculating circuit passes from the heat exchanger (30) to the RO unit (70) forming the permeate solution (75), which is introduced into the evaporative cooling apparatus (10), and which then passes back to the heat exchanger (30) and the process is repeated.

The $CO_2$ storage vessel (15) is in fluid communication with the circuit and $CO_2$ gas (20) may be fed into the circuit using control means (25). In this embodiment, $CO_2$ (20) is fed into the circuit upstream of the heat exchanger (30). This is advantageous as the increased $CO_2$ reduces scaling in the heat exchanger (prolonging its useful life).

Optionally one or more pumps (5) may be used to pump the coolant around the circuit.

Optionally, the coolant in the circuit is fed into a pre-treatment unit (60). Preferably, the pre-treatment unit (60) removes or reduces and suspended particles and/or contaminants from the coolant. Preferably, the pre-treatment unit is positioned upstream of (before) the RO unit (70), such that the coolant is purified before entering the RO unit (70). This will prolong the life of the membrane in the RO unit by reducing scaling and/or fouling of the membrane.

A portion of the coolant may be removed from the circuit as blow-down (40). Advantageously, concentrating the total dissolved solids in the retentate solution (65) which is removed from the system (circuit) reduces the amount of blow-down required.

Make-up feed solution (coolant) can be added to the system as required (not shown).

The process and/or apparatus may further comprise one or more pH and/or alkalinity meters, and/or conductivity meters.

FIG. 2 shows another embodiment of the apparatus and process of the described invention. The reference numerals used in FIG. 2 correspond with those used in FIG. 1, but have been further annotated with the letter "a". In this embodiment, the heat exchanger (30a) is positioned downstream of the reverse osmosis unit (70a) and $CO_2$ gas (20) feed is upstream of the reverse osmosis unit (70a) and the heat exchanger (30a).

FIG. 3 shows another embodiment of the apparatus and process of the present invention. The reference numerals used in FIG. 2 correspond with those used in FIG. 1, but have been further annotated with the letter "b". In this embodiment, $CO_2$ gas (20) feed is upstream of the reverse osmosis unit (70b) and downstream of the heat exchanger (30b).

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A process for cooling a heated coolant, comprising:
   (a) passing a heated coolant to an evaporative cooling apparatus, wherein the heated coolant is cooled by evaporation to provide a cooled coolant, and maintaining a pH of the cooled coolant below 6.5 by introducing an acidic gas comprising carbon dioxide into said cooled coolant;
   (b) heating at least a portion of the cooled coolant from step (a) to provide a heated coolant portion;
   (c) recycling at least a portion of the heated coolant portion from step (b) to step (a) to form a circuit;
   (d) passing at least a portion of the coolant selected from the group consisting of the cooled coolant, and the heated coolant portion to a reverse osmosis unit for forming a retentate solution and a permeate solution;
   (e) introducing at least a portion of the permeate solution into the circuit; and
   (f) removing the retentate solution.

2. The process according to claim 1, further comprising selecting and passing the heated coolant portion to the reverse osmosis unit.

3. The process according to claim 1, further comprising introducing the acidic gas to the coolant prior to heating the coolant.

4. The process according to claim 1, further comprising passing the coolant through an ultra-filtration unit.

5. The process according to claim 1, further comprising heating the coolant using a heat exchanger.

6. The process according to claim 1, wherein the evaporative cooling apparatus comprises a cooling tower.

7. The process according to claim 1, wherein the coolant is selected from the group consisting of river water, bore hole water (well water), mains water (tap water), and reclaimed waste water.

8. The process according to claim 1, wherein the coolant comprises additives selected from the group consisting of one scale inhibitor, a plurality of scale inhibitors, corrosion inhibitors, biocides, and mixtures thereof.

* * * * *